(12) United States Patent
Unger et al.

US007628877B2

(10) Patent No.: US 7,628,877 B2
(45) Date of Patent: Dec. 8, 2009

(54) COMPOSITE STRUCTURAL MATERIAL AND METHOD THEREFOR

(75) Inventors: Jeff C. Unger, Huntington Beach, CA (US); Shane F. Cuda, Long Beach, CA (US); J. Steve Mills, Orange, CA (US); Bevan R. Whitaker, Irvine, CA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 11/506,364

(22) Filed: Aug. 18, 2006

(65) Prior Publication Data

US 2007/0034325 A1    Feb. 15, 2007

Related U.S. Application Data

(62) Division of application No. 10/686,065, filed on Oct. 7, 2003, now abandoned.

(51) Int. Cl.
*B29C 65/00* (2006.01)
*B32B 3/00* (2006.01)
*B32B 5/00* (2006.01)
*B32B 5/18* (2006.01)
*B32B 37/00* (2006.01)
*B32B 37/02* (2006.01)
*B32B 3/12* (2006.01)
*B32B 3/26* (2006.01)
*B31C 1/00* (2006.01)
*B31C 3/00* (2006.01)
*B65H 81/00* (2006.01)
*B65C 3/16* (2006.01)

(52) U.S. Cl. .................. 156/77; 156/184; 156/190; 156/215; 156/304.5; 428/158; 428/304.4; 428/315.9

(58) Field of Classification Search ............... 156/77, 156/78, 157, 184, 185, 187, 188, 190, 194, 156/217, 218, 304.1, 304.2, 304.5, 304.6, 156/215; 244/172.2, 172.3, 123.1, 123.13, 244/123.2, 123.5, 123.6, 123.7, 1 N; 416/229 R; 428/36.5, 44, 47, 48, 54, 55, 56, 116, 117, 428/118, 146, 158, 159, 160, 304.4, 309.9, 428/315.9, 318.4, 308.4, 314.4; 220/901; 138/141, 149; 285/290.1, 332, 332.1; 181/288, 181/290, 292; 52/309.9, 309.11
See application file for complete search history.

(56) References Cited

U.S. PATENT DOCUMENTS 2,833,003 A * 5/1958 Bourne et al. ............. 52/800.13
4,530,379 A * 7/1985 Policelli .................... 138/109
4,801,483 A * 1/1989 Beckerman et al. ........... 428/71

(Continued)

*Primary Examiner*—Richard Crispino
*Assistant Examiner*—Brian R Slawski
(74) *Attorney, Agent, or Firm*—Yee & Associates, P.C.; Dennis R. Plank (57) ABSTRACT

Methods and apparatus are provided for a composite structural material. A non-solid composite section that is filled with a structural foam that reduces the weight of the composite structural material. A solid composite section that is coupled to the non-solid composite section. The solid composite section is an area for structural attachment for the composite structural material. A region adjoining the non-solid composite section to the composite section is radiused to reduce stress when the structural foam is bonded to the region. The radius in the region prevents delamination and cracking of the structural foam when a load is placed on the composite structural material.

17 Claims, 5 Drawing Sheets

U.S. PATENT DOCUMENTS

| | | | | |
|---|---|---|---|---|
| 5,060,291 A | * | 10/1991 | Albertelli | 428/306.6 |
| 5,102,723 A | * | 4/1992 | Pepin | 428/223 |
| 5,215,796 A | * | 6/1993 | Mueller et al. | 428/36.5 |
| 6,324,996 B1 | * | 12/2001 | Saxton et al. | 105/355 |
| 6,330,941 B1 | * | 12/2001 | Guldenfels | 198/853 |

* cited by examiner

COMPOSITE STRUCTURAL MATERIAL AND METHOD THEREFOR

RELATED APPLICATION

This application is a divisional of U.S. patent application Ser. No. 10/686,065, filed Oct. 7, 2003 now abandoned.

TECHNICAL FIELD

The present invention generally relates to structural materials, and more particularly relates to a composite structural material comprising both a non-solid composite section and a solid section for building structural components that are lightweight, have high loading capability, and can be structurally attached to other elements.

BACKGROUND

In many industries there is a need for lightweight structural materials for building components. For example, the aircraft and aerospace industries desire materials that can be formed into complex shapes yet have low weight and can withstand heavy loading. Aluminum is a commonly used material that fits these general needs. For example, a composite material is formed from an aluminum skin placed over a frame. The frame is often made of aluminum or other lightweight materials. The frame provides the strength while the aluminum skin provides a working surface for the material. For example, a control surface of an airplane such as a rudder or elevator are made from a composite material that can be reliably moved by mechanical means yet withstand the loading induced during normal and extreme operation. Carbon fiber and plastic are two alternatives used to form a composite structural material.

Another type of composite material capable of structural use is a frameless composite structural material. A lightweight shell is formed that is filled with foam. The foam bonds to the shell forming an integrated structure. Both the foam and shell combine to create an extremely strong composite structural material. In fact, in many foam filled composite materials, the majority of the strength comes from the foam used. Foam is used because it is extremely lightweight and depending on the material can have high compressive and shear strength when formed in a sandwich structure with other solid materials.

Accordingly, it is desirable to provide a composite structural material that is extremely strong and lightweight. In addition, it is desirable to reduce the manufacturing cost of the composite structural material. It would be of further benefit if the composite structural material included a solid section for structural attachment. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a composite structural material. The apparatus comprises a non-solid composite section that is filled with a structural foam that reduces the weight of the composite structural material. A solid section is coupled to the non-solid composite section. The solid composite section provides an area for structural attachment on the composite structural material. An interface region adjoining the non-solid composite section to the solid section is radiused to reduce stress on the structural foam bonded thereto. The composite structural material has increased loading capability before delamination and cracking of the structural foam occurs.

A method is provided for increasing a strength of a composite structural material under load. The composite structural material includes a non-solid foam filled section and at least one solid section for structural attachment. The method comprises forming a curved surface in an interface region interior to the composite structural material where the non-solid foam filled section adjoins the at least one solid section. A structural foam in said non-solid foam filled section is bonded to the interface region. The stress on the structural foam is reduced in the interface region thereby increasing a loading capability of the composite structural material.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
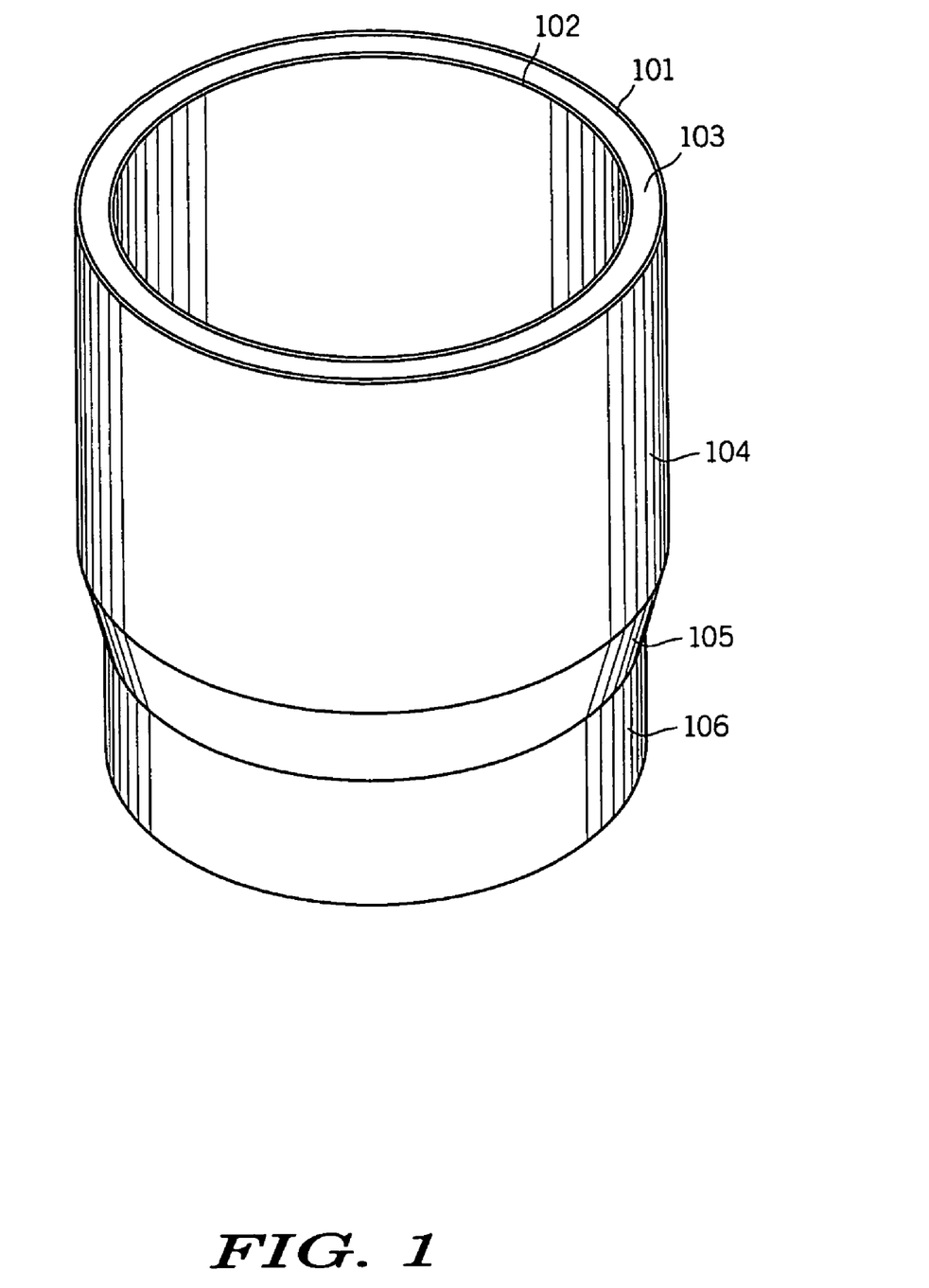
FIG. 1 is an illustration of a circular shell formed from a composite structural material.

FIG. 1 is an illustration of a circular shell formed from a composite structural material. The composite structural material comprises a non-solid composite section 104, a ramp section 105, and a solid section 106. One example of a use for this type of composite structural material is a launch vehicle such as a liquid oxygen rocket assembly utilizing composite sandwich structures to save weight and construction cost. Non-solid composite section 104 is shown in the circular shell and comprises an outer layer of material 101, an inner layer of material 102, and a middle layer of structural foam material 103. Structural foam material 103 bonds to outer layer of material 101 and inner layer of material 102 to form a composite sandwich that is both light in weight and strong under loading.

In an embodiment of the rocket assembly, the circular shell couples to both a cryogen tank above and a cryogen tank below. One cryogen tank stores liquid oxygen while the other stores liquid hydrogen that is used as a propellant in the rocket assembly. The liquid oxygen and liquid hydrogen produces a cold temperature environment around the circular shell. The cryogen tanks are vented which exhaust the liquid oxygen near the circular shell. In general, a wall thickness of non-solid composite section 104 in an application for a rocket assembly is in a range of 25 to 40 millimeters thick. The selected wall thickness of non-solid composite section 104 is uniform throughout the entire section. The circular shell has a diameter on the order of 5 meters and a height of approximately 91.5 centimeters.

A problem with forming a rocket assembly is the attachment of the circular shell to the cryogen tank above and the cryogen tank below. In an embodiment of the circular shell, solid section 106 is placed fore or aft of non-solid composite section 104. Although a single solid section is shown in FIG. 1 it should be noted that the structural material is capable of having more than one solid section coupled to non-solid composite section 104. In an embodiment of the circular shell, a wall thickness of solid section 106 is less than the wall thickness of non-solid composite section 104. The wall thickness is uniform throughout solid section 106. Ramp section 105 transitions non-solid composite section 104 to solid section 106. Ramp section 105 tapers or ramps from the wall thickness of non-solid composite section 104 to the thinner wall of solid section 106. Ramp section 105 is also filled with structural foam material 103.

Solid section 106 allows for structural attachment to one of the cryogen tanks. For example, attachment may be achieved by a compressive means such as bolting or clamping. A bolt places a compressive force on the materials being coupled together. A solid material is capable of handling this type of compressive force but a structural foam filled non-solid composite section would collapse under the force. Thus, structural attachment to the non-solid composite section of the circular shell is not feasible. It is understood that the circular shell must be capable of withstanding the loading placed on it during operation of the rocket assembly. Failure in any section of the composite structural material could have devastating consequences to the rocket assembly.

The composite structural material described in FIG. 1 is useful in many applications other than a rocket assembly where structural attachment, loading capability, cost, and weight are an issue. For example, the air transportation industry has many applications where components need to be light in weight and have high strength. Control surfaces, floor panels, and cargo liners are but a few structural elements where a composite structural material as described hereinabove would be useful. An example of a control surface of an airplane is a rudder or elevator.

Figure 2:
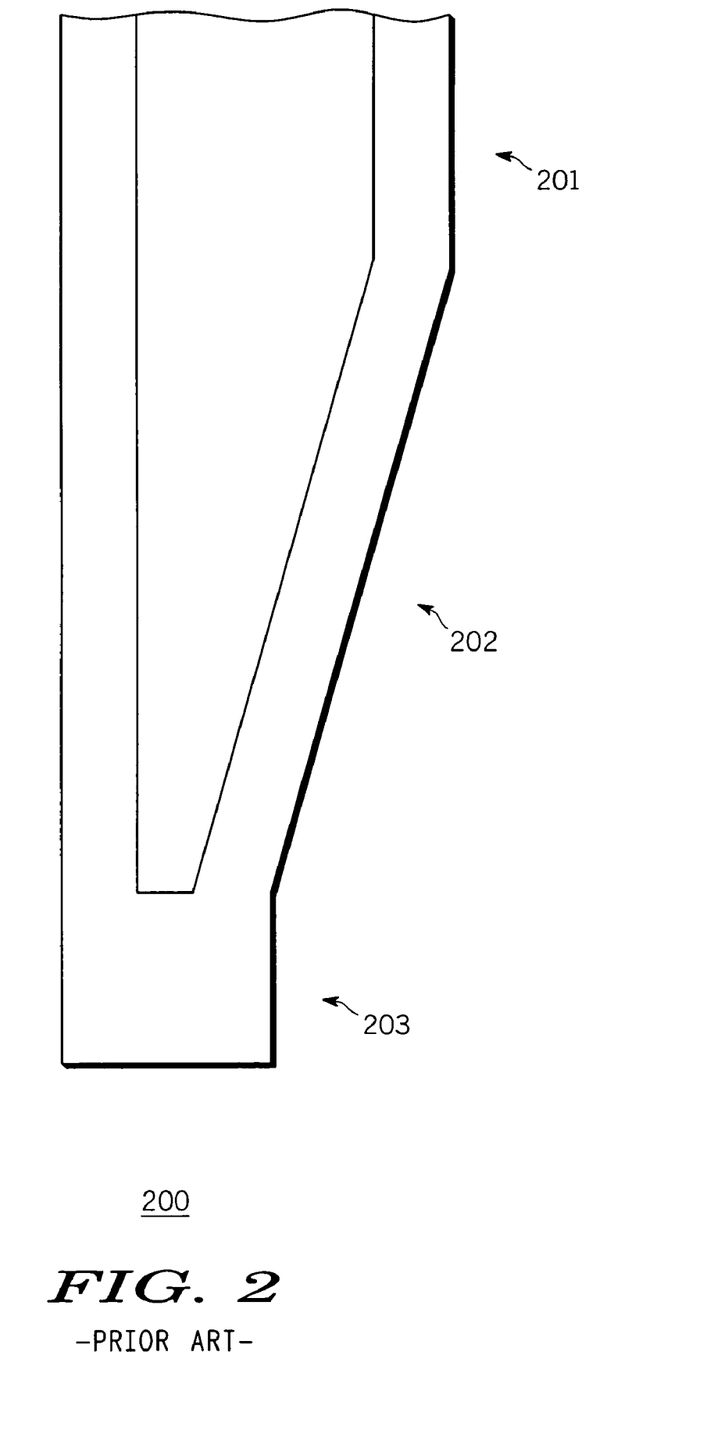
FIG. 2 is a cross-sectional view of a prior art composite structural material.

FIG. 2 is a cross-sectional view of a prior art composite structural material 200. Composite structural material 200 comprises a non-solid composite section 201, a ramp section 202, and a solid section 203. In an embodiment of composite structural material 200, non-solid composite section 201 includes an inner structural foam filled layer. As shown, non-solid composite section 201 has a different wall thickness than solid section 203. The wall thickness of non-solid composite section 201 is uniform and does not vary substantially. Similarly, the wall thickness of solid section 203 is uniform throughout. Ramp section 202 couples non-solid composite section 201 to solid section 203. A surface of ramp section 202 is angled or ramped to compensate for the different wall thicknesses of non-solid composite section 201 and solid section 203. The thickness of ramp section 202 is not uniform throughout; it tapers from non-solid composite section 201 to solid section 203. Ramp section 202 also includes an inner structural foam filled layer.

Solid section 203 of composite structural material 200 is typically used for structurally attaching to another element. Composite structural material 200 can be formed having more than one solid region thereby providing multiple regions for structural attachment. For example, composite structural material 200 is formed as a sheet. Non-solid composite section 201 is formed rectangular in shape where each of the four sides is coupled to a solid section for structural attachment. The solid sections can be securely attached to another structure allowing a load to be placed on composite structural material 200. The interaction between non-solid composite section 201, ramp section 202, and solid section 203 determines the strength of composite structural material 200.

Composite structural material 200 has been found to have negative structural margins in some applications. An example is using composite structural material 200 to form a circular shell such as described in FIG. 1. Under various loading and environmental conditions it has been found that composite structural material 200 fails. In particular, the mechanism for failure has been identified as delamination or cracking of the inner layer of structural foam material in non-solid composite section 201 and ramp section 202 which destroys the integrity of the sandwich structure. Once delamination or cracking of the structural foam material occurs the load capability of composite structural material 200 is reduced thus ensuring that degradation continues under load. Referring to FIG. 1, cryogen tanks were placed above and below the composite structural material. The cryogen tanks vented cold gas near the composite structural material. It has been found that cold temperatures further exacerbate the problem of cracking and delamination.

Figure 3:
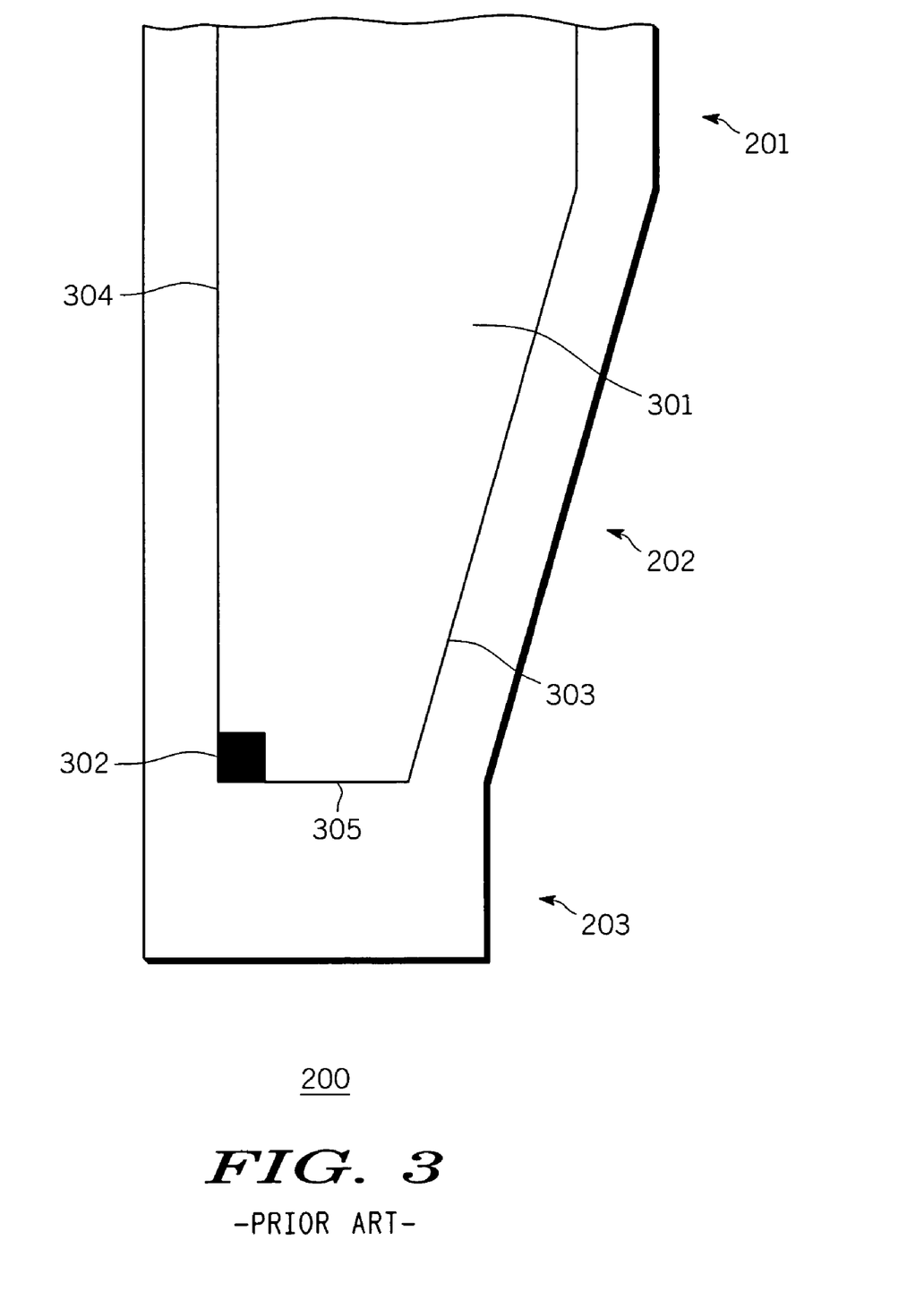
FIG. 3 is a magnified view of the cross-section of the ramp section of FIG. 2 showing stress on an inner layer of structural foam material.

FIG. 3 is a magnified view of the cross-section of ramp section 202 of FIG. 2 showing a peak stress 302 on a structural foam layer 301. Structural foam layer 301 in ramp section 202 bonds to a surface 303, a surface 304, and a surface 305. Surface 305 is an interface region where ramp section 202 adjoins solid section 203. Surfaces 303-305 are planar surfaces. In particular, surface 304 meets surface 305 at a 90 degree angle. Surface 303 meets surface 305 at an obtuse angle since it forms the ramp that compensates for the difference in wall thickness between non-solid composite section 201 and solid section 203. It has been found that peak stress 302 occurs in the corner where surfaces 304 and 305 meet. It is believed that delamination and cracking begins in the location of peak stress 302 during loading and temperature change. As mentioned previously, once delamination and cracking begins in structural foam layer 301 it continues throughout composite structural material 200 over time. Delamination typically occurs between surfaces 303-305 and structural foam layer 301.

Figure 4:
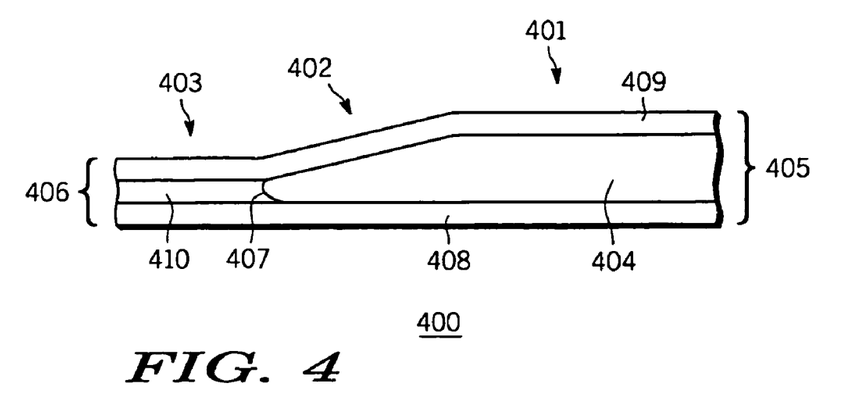
FIG. 4 is a cross-sectional view of a composite structural material in accordance with the present invention.

FIG. 4 is a cross-sectional view of a composite structural material 400 in accordance with the present invention. Composite structural material 400 comprises a non-solid composite section 401, a transition section 402, and a solid section 403. Composite structural material 400 is designed for low weight, high load carrying capability, wide temperature operability, and low cost of manufacturing. Non-solid composite section 401 weighs significantly less per unit area than solid section 403. Typically, the majority of composite structural material 400 comprises non-solid composite section 401. Thus, composite structural material 400 as shown is for illustration purposes and the actual amount of surface area of each type of section can vary depending on the application.

In an embodiment of composite structural material 400, a layer 408 forms a first major surface of composite structural material 400. A layer 409 forms a second major surface of composite structural material 400. In general, layers 408 and 409 are a solid material. In an embodiment of composite structural material 400, layers 408 and 409 are formed from graphite and epoxy. Layers 408 and 409 comprise graphite/epoxy facesheets that are layered to a predetermined thickness for the specific application. The graphite/epoxy facesheets can be cut and shaped using a form to make complex structures. The formed graphite/epoxy facesheets are cured under pressure at an elevated temperature to harden and bond together. The exact thickness and material choice is determined by the application and environment. Layers 408 and 409 may comprise other materials such as metal, metal alloys, plastic, and organic materials. Layers 408 form major surfaces for handling a load and isolate a structural foam layer 404 from an external environment.

Structural foam layer 404 is a layer of material between layers 408 and 409 in non-solid composite section 401 and transition section 402. In general, non-solid composite section 401 and transition section 402 are contiguous and formed similarly, each including structural foam layer 404. The main difference between non-solid composite section 401 and transition section 402 are dimensional. Non-solid composite section 401 has a wall thickness that comprises layer 408, structural foam layer 404, and layer 409. The wall thickness of non-solid composite section 401 is substantially uniform throughout. That is not the case for transition section 402. The wall thickness varies within transition section 402 comprising layer 408, structural foam layer 404, and layer 409. In an embodiment of composite structural material 400, structural foam layer 404 varies in thickness in transition section 402 while layers 408 and 409 have a uniform thickness. Transition section 402 compensates for a difference in wall thickness between non-solid composite section 401 and solid section 403. In an embodiment of composite structural material 400, transition section 402 has a wall thickness substantially equal to non-solid composite section 401 where transition section 402 adjoins non-solid composite section 401. Similarly, transition section 402 has a wall thickness substantially equal to solid section 403 where transition section 402 adjoins solid section 402. In an embodiment of transition section 402, this is achieved by forming a ramp in layer 409 and structural foam 404.

Structural foam layer 404 bonds to layers 408 and 409 internal to composite structural material 400. An integral sandwich structure is formed comprising layer 408, structural foam layer 404, and layer 409. Individually, layer 408, structural foam layer 404, and layer 409 do not have near the strength or load capability of the bonded composite sandwich structure. Non-solid composite section 401 and transition section 402 are both considered non-solid because of structural foam layer 404. Structural foam layer 404 comprises foam cells where the structural integrity is provided by the walls of each cell and the interior of each foam cell is filled with a non-solid material (for example, gas). The structural foam material is often characterized by the dimensional size of an average foam cell and the strength of the foam. Typically, a single dimension is given for the average foam cell size (height, length, width are approximately equal). Fastening to non-solid composite section 401 is problematic using conventional techniques such as bolting or clamping because they apply a compressive force to the material that would collapse the structure. Solid section 403 is included in composite structural material 400 to provide an area for structural fastening because of this limitation.

In an embodiment of composite structural material 400, structural foam layer 404 is a polymethacrylimide foam. The polymethacrylimide foam is lightweight, bonds well to graphite/epoxy based material, and has high load capability. Composite structural material 400 is not limited to this type of foam. Metal foams and other structural foams of different chemical composition can be used depending on the material used in layers 408 and 409 and the specific application in which composite structural material 400 is used.

Non-solid composite section 401 has a wall thickness 405. Solid section 403 has a wall thickness 406. In an embodiment of composite structural material 400, wall thickness 405 is greater than wall thickness 406. Transition section 402 compensates for the difference in wall thickness between non-solid composite section 401 and solid section 403. As mentioned previously, layer 409 and structural foam layer 404 are ramped or angled in transition section 401. An interface region 407 exists where solid section 403 adjoins transition section 402. Interface region 407 is radiused in this area to have a curved surface. Structural foam layer 404 is bonded to the curved surface of interface region 407. In an embodiment of composite structural material 400, interface region 407 is formed having a bullnose shaped (curved) surface that will be described in more detail hereinbelow. Thus, the prior art 90 degree angle and obtuse angle as described in FIG. 3 where the ramp section meets the solid section is eliminated. In other words, the singularity where stress concentration occurs such as the 90 degree angle or obtuse angle is greatly reduced by changing it to a curved surface. The stress problem is compounded by the difference in the coefficient of thermal expansion (CTE) between the graphite/epoxy material used to form layers 408 and 409 and the CTE of structural foam layer 404. The benefits of forming the curved surface where solid section 403 adjoins transition section 402 are substantial. Testing of composite structural material shows an increase in loading capability of greater than 25% when compared to equivalent prior art composite structural materials. It is now believed that delamination and cracking initiates in the region of highest stress. Decreasing the peak stress correspondingly increases the loading capability of composite structural material 400 where delamination or cracking occurs. For example, for the rocket assembly described in FIG. 1 using composite structural material 400 formed in a circular shell now has a positive structural margin and can also operate at lower temperatures. It should be noted that forming the curved surface in interface region 407 is not limited to the case where wall thickness 405 is greater than wall thickness 406. The principal can be applied with similar benefits to the cases when wall thickness 405 is equal to or less than wall thickness 406.

A process for forming a circular shell similar to that described in FIG. 1 using composite structural material 400 begins with a cylindrical form. The form could be made of a material such as metal. The metal form in this example is a cylinder 5 meters in diameter and approximately 90 centimeters in height. Graphite/epoxy facesheets are layered on the exterior major surface of the cylindrical form. The graphite/epoxy facesheets stick to the cylindrical form and to each other. The facesheets are cut and layered to a predetermined thickness on the cylindrical form. The resultant layers of graphite/epoxy facesheets corresponds in combination to layer 408. A structural foam material is placed on layer 408. The structural foam material will adhere to layer 408. The structural foam material can also be shaped. The structural foam material is shaped having a uniform thickness in a region corresponding to non-solid composite section 401. Material is removed from the structural foam material in a region corresponding to transition section 402 to form a ramp or angle. A curved surface or bullnose is formed in structural foam material located where the solid section is to be formed. Thus, the modified structural foam material now corresponds to structural foam layer 404.

Layers of graphite/epoxy facesheets are then cut and fitted to form a region corresponding to solid section 403. In particular the facesheets abut to the curved surface formed in the structural foam material. In general, any gaps in building up the graphite and epoxy facesheets near the curved surface in the structural foam material will be filled with resin that as an integrated structure produces a solid surface contacting the curve surface. This build up of the region corresponding to solid section 403 and specifically corresponds to a layer 410. Layer 410 may comprise one or more layers of material to achieve the desired thickness of solid section 403. Finally, graphite and epoxy face sheets are placed over both the exposed structural foam material and layer 410. This build up of a layer corresponds to layer 409. In general, the graphite and epoxy layers are built up having a uniform thickness. Thus, composite structural material 400 has been formed into its desired shape. The cylindrical shell is then placed in a pressurized furnace to cure both the foam and graphite/epoxy layers. The graphite/epoxy layers harden into an extremely strong solid material. Once cured, the cylindrical form is removed and composite structural material 400 is ready for use.

Figure 5:
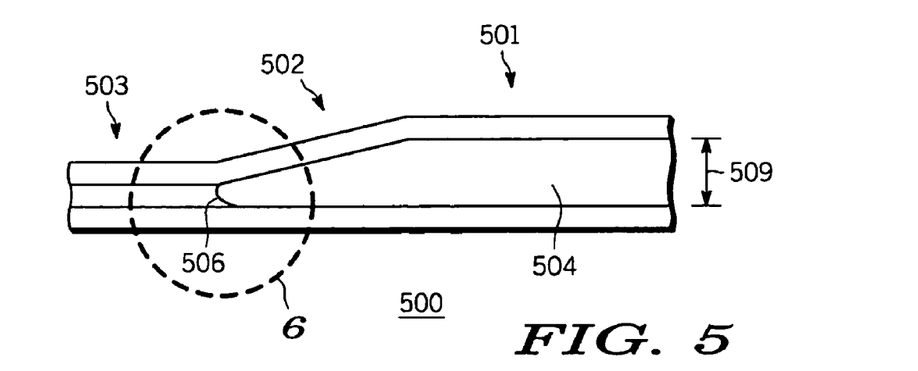
FIG. 5 is a cross-sectional view of a composite structural material in accordance with the present invention.
Figure 6:
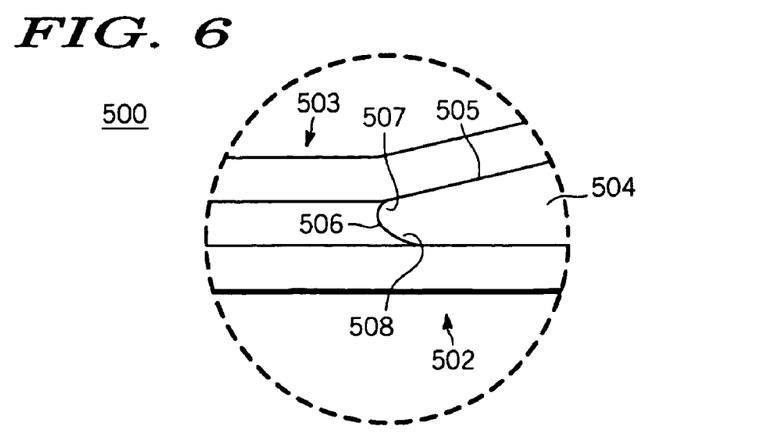
FIG. 6 is a magnified view of the curvature placed in the ramp section of FIG. 5 in accordance with the present invention.

FIGS. 5 and 6 are both used in showing a curvature placed in a composite structural material 500 to reduce stress. FIG. 5 is a cross-sectional view of the composite structural material 500 in accordance with the present invention showing a magnified view of a curved surface 506 placed on a structural foam layer 504. FIG. 6 is a magnified view of the curvature placed in the ramp section of FIG. 5 in accordance with the present invention. Composite structural material 500 is similar to composite structural material 400 described in FIG. 4. Composite structural material 500 comprises a non-solid composite section 501, a transition section 502, and a solid section 503. Non-solid composite section 501 and transition section 502 include structural foam layer 504.

Non-solid composite section 501 has a wall thickness that is greater than a wall thickness of solid section 503. Transition section 502 compensates for the difference in wall thickness and couples non-solid composite section 501 to solid section 503. In an embodiment of transition section 502, structural foam layer is sloped to form a ramp 505. The slope of ramp 505 is formed in structural foam layer 504 such that a wall thickness where transition section 502 adjoins non-solid composite section 503 is substantially equal. Similarly, a wall thickness where transition section 502 adjoins solid section 503 is substantially equal. A curved surface is formed at an interface region that adjoins transition section 502 to solid section 503. The curved surface at the interface region corresponds to curved surface 506 formed on structural foam layer 504 that is shown in magnified view. Structural foam layer 504 bonds to the curved surface at the interface region.

In an embodiment of composite structural material 500, structural foam layer 504 is formed having a thickness of approximately 0.75 inches in non-solid composite section 501. Structural foam layer 504 tapers in transition section 502 from 0.75 inches to a thickness of approximately 0.192 inches at the interface region corresponding to curved surface 506. In this embodiment, structural foam layer 504 comprises a structural polymethacrylimide foam. A bullnose shape being formed from two different radii was proven to provide substantial benefit. The lower portion of the bullnose is where peak stress occurs. The lower portion has a rate of curvature that is lower than the upper portion of the bullnose. A radius 508 in this lower portion was manufactured having a radius of 0.156 inches. A radius 507 in the upper portion of the bullnose where the stress build up is not as high as the lower portion was manufactured having a radius of 0.05 inches.

Figure 7:
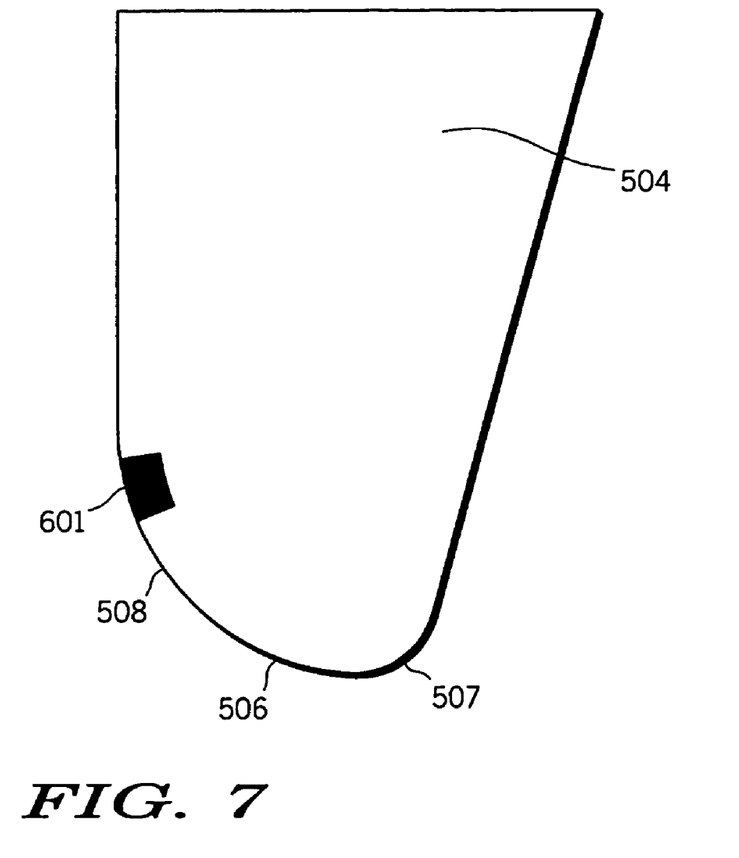
FIG. 7 is a stress analysis showing a peak stress on the curved surface in the composite structural material shown in FIG. 6.

FIG. 7 is a stress analysis showing a peak stress 601 on curved surface 506 in the composite structural material described in FIG. 6. Peak stress 601 occurs where structural foam layer 504 has a radius 508 of 0.156 inches. Peak stress 601 for the dimensions disclosed in FIG. 6 is approximately 878 psi (pounds per square inch). Stress analysis on a prior art composite structural material having a 90 degree angle where the surfaces meet (as described in FIG. 3) yielded a peak stress of 1152 psi. As mentioned previously, it is believed that the predominant failure mechanism of the composite structural material begins with delamination or cracking in an area of peak stress 302 as shown in FIG. 3. The substantial reduction in stress as shown greatly increases the loading capability of the composite structural material. It has also been identified that the radiuses 507 and 508 formed on structural foam layer 504 should have a relationship with the cell size of the structural foam being used in the composite structural material. The curved surface on structural foam layer 504 (and the interface region) should be formed having a radius greater than 2 times the dimension for an average cell size of the structural foam material being used to ensure a high loading capability for the composite structural material.

Figure 8:
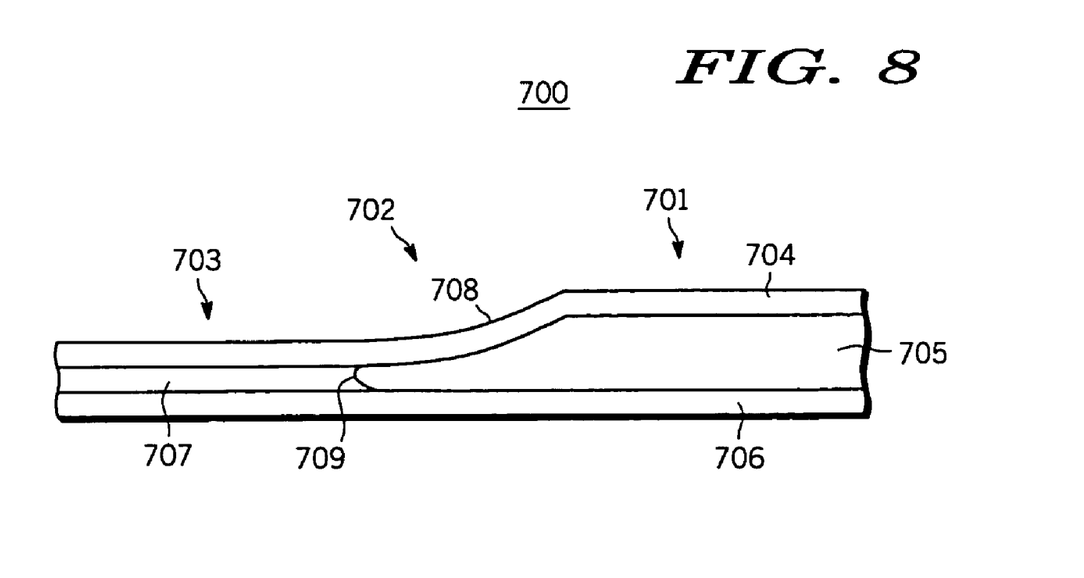
FIG. 8 is a cross-sectional view of a composite structural material in accordance with the present invention.

FIG. 8 is a cross-sectional view of a composite structural material 700 in accordance with the present invention. Composite structural material 700 comprises a non-solid composite section 701, a transition section 702, and a solid section 703. A layer 704 forms a first major surface of composite structural material 700 and is included in non-solid composite section 701, a transition section 702, and a solid section 703. Similarly, a layer 706 forms a second major surface of composite structural material 700 and is included in non-solid composite section 701, transition section 702, and solid section 703. In general, layers 704 and 706 are formed from a solid material such as graphite/epoxy, metal, plastic, or organic material. A structural foam layer 705 is placed between layers 704 and 706 in non-solid composite section 701 and transition section 702. A layer 707 may comprise one or more layers of solid material and is placed between layers 704 and 706 in solid section 703.

As shown, non-solid composite section 701 has a wall thickness greater than solid section 703. The wall thickness of non-solid composite section 701 comprises layers 704-706. The wall thickness of solid section 703 comprises layers 704, 706, and 707. In an embodiment of composite structural material 700, layer 706 is planar. Transition section 702 couples non-solid composite section 701 to solid section 703. Transition section 702 compensates for the difference in wall thickness between non-solid composite section 701 and solid section 703 by tapering the wall thickness in transition section 702. As mentioned previously, prior art composite structural materials form a planar ramp section to adjust for wall thickness difference between the non-solid composite section and the solid section. The prior art planar ramp slopes linearly. An interface region of the prior art composite structural material interior to prior composite structural material has a 90 degree angle and an obtuse angle in an area where the ramp section adjoins the solid section. The structural foam material in the ramp section is bonded to the interface region. A region of high stress is produced in the area of the 90 degree angle that reduces the loading capability of the composite structural material.

As similarly described in FIG. 6, a bullnose shape can be formed in an interface region 709 to reduce stress and increase the loading capability of composite structural material 700. Interface region 709 is interior to composite structural material 700 and located where transition section 702 adjoins solid section 703. It has been found that further benefit is derived by forming a curved surface 708 in transition section 702 on layer 704. Curved surface 708 compensates for the wall thickness difference between non-solid composite section 701 and solid section 703. Curved surface 708 further reduces peak stress in structural foam layer 705 thereby increasing the loading capability of composite structural material 700 further.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for manufacturing a structure having a first surface and a second surface opposite the first surface, the method comprising:
    forming the structure such that the structure comprises:
        a first section, wherein the structure is solid between the first surface and the second surface in the first section; and
        a second section, wherein the second section has a space between the first surface and the second surface, wherein, in the second section, the first surface is part of a first wall having a first interior surface facing the space and the second surface is part of a second wall having a second interior surface facing the space, and wherein in the second section an interface surface faces the space, the interface surface being adjacent the first section; and
    placing a foam in the second section such that the foam occupies the space, wherein the foam is bonded to the first interior surface, the second interior surface, and the interface surface;
        wherein the structure is further formed such that the interface surface has a bullnose shape, wherein the bullnose shape has an upper portion nearer the second surface and a lower portion nearer the first surface, wherein the upper portion has a first rate of curvature and the lower portion has a second rate of curvature, and wherein the first rate of curvature is higher than the second rate of curvature.

2. The method of claim 1 wherein the structure is further formed such that the foam, which conforms to the curved shape of the interface surface, adheres to the first section.

3. The method of claim 1 wherein the structure is further formed such that the interface surface has a bullnose shape.

4. The method of claim 1 wherein the structure is further formed such that the first surface has a uniform shape and the second surface has a ramp section in which the second surface is increasingly extending outwardly relative to the first surface.

5. The method of claim 4 wherein the structure is further formed such that the ramp section is part of the second section.

6. The method of claim 5 wherein the structure is further formed such that the ramp section extends for only a portion of the second section.

7. The method of claim 4 wherein the structure is further formed such that the interface surface has a bullnose shape, wherein the bullnose shape has an upper portion nearer the second surface and a lower portion nearer the first surface, wherein the upper portion has a first radius and the lower portion has a second radius greater than the first radius.

8. The method of claim 7 wherein the structure is further formed such that the first radius is greater than twice an average cell size of the foam.

9. A method for forming a structure, the method comprising:
    providing a cylindrical form;
    layering first facesheets on an exterior major surface of the cylindrical form, wherein the first facesheets stick to the cylindrical form and to each other, wherein a first layer is formed;
    adhering a foam on the first layer, wherein the foam extends over less than an entire length of the first layer such that no foam is over a first region of the first layer, wherein the foam has an interface with a curved shape extending from the first layer to a third layer;
    layering second facesheets on the first region, wherein the second facesheets stick to the first layer and to each other, wherein a second layer is formed to abuts the curved shape; and
    layering third facesheets over both the second layer and also over the foam, wherein the third facesheets stick to the second layer and to the foam, wherein the third layer is formed, and wherein together the first layer, the foam, the second layer, and the third layer form the structure.

10. The method of claim 9 further comprising:
    removing material from the foam to form the curved shape.

11. The method of claim 10 further comprising:
    filling gaps between the curved shape and the first region with a resin.

12. The method of claim 10 wherein the curved shape is a bullnose shape.

13. The method of claim 12 further comprising:
    removing material from the foam such that a ramp region is formed in the foam, wherein removed material is opposite the first layer.

14. The method of claim 13 wherein the bullnose shape has an upper portion nearer the ramp region and a lower portion nearer the first layer, wherein the upper portion has a first radius and the lower portion has a second radius greater than the first radius.

15. The method of claim 14 wherein the first radius is greater than twice an average cell size of the foam.

16. The method of claim 9 further comprising:
    curing the structure in a pressurized furnace to cure both the foam, the first facesheets, the second facesheets, and the third facesheets.

17. A method for attaching a first structure to a second structure, the method comprising:
    providing the first structure, the first structure comprising:
        a first surface and a second surface;
        a first section, wherein the first structure is solid between the first surface and the second surface in the first section;
        a second section, wherein the second section has a space between the first surface and the second surface, wherein, in the second section, the first surface is part of a first wall having a first interior surface facing the space and the second surface is part of a second wall having a second interior surface facing the space, and wherein in the second section an interface surface faces the space, the interface surface being adjacent the first section; and a foam in the second section such that the foam occupies the space, wherein the foam is bonded to the first interior surface, the second interior surface, and the interface surface, and wherein the foam will collapse under a compressive force sufficient to attach the first structure to the second structure; and attaching the first section to the second structure using a compressive force, wherein attaching is accomplished using a clamp.

\* \* \* \* \*